Feb. 19, 1935.  J. Q. HOLMES  1,991,672
CLUTCH TESTING APPARATUS
Filed May 16, 1930   5 Sheets-Sheet 5
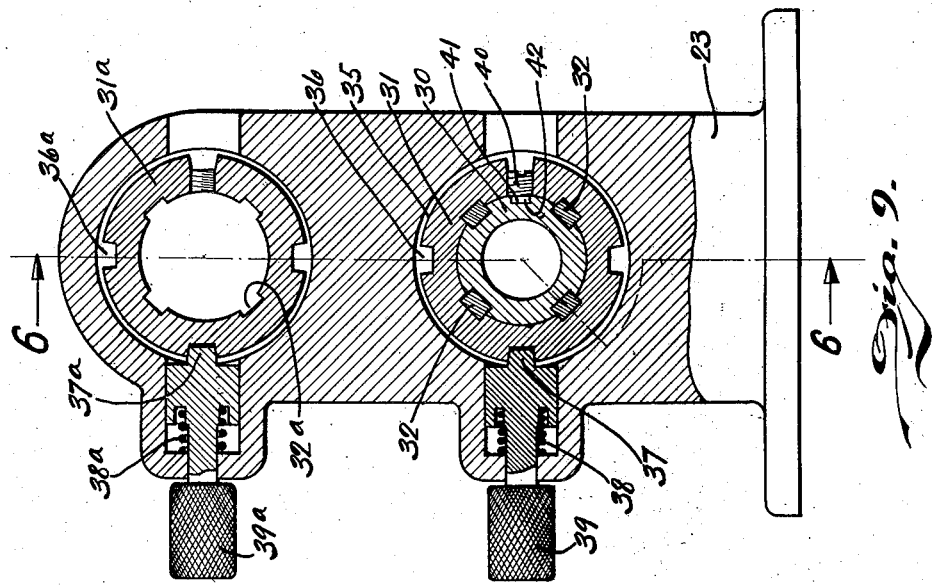
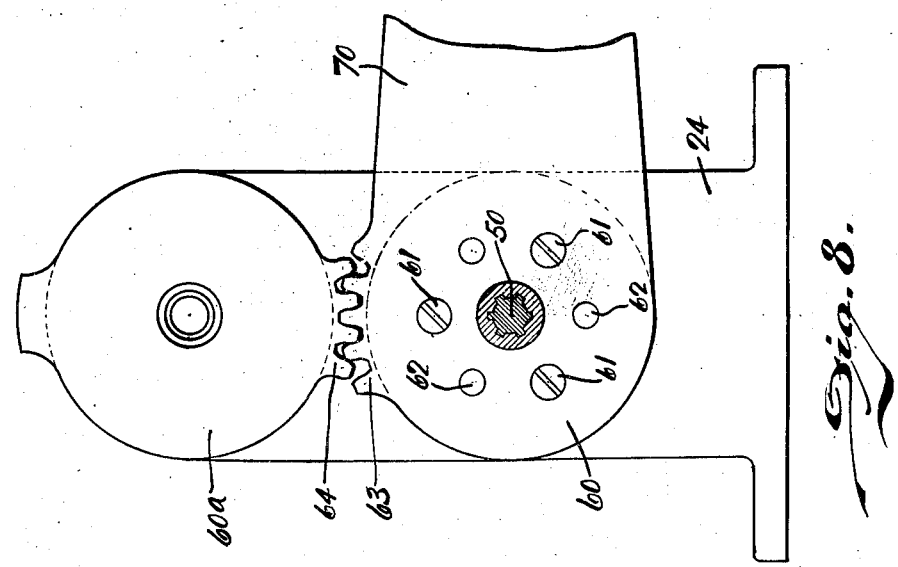
Inventor
John Q. Holmes
By Spencer Hardman Fehr
his Attorneys.

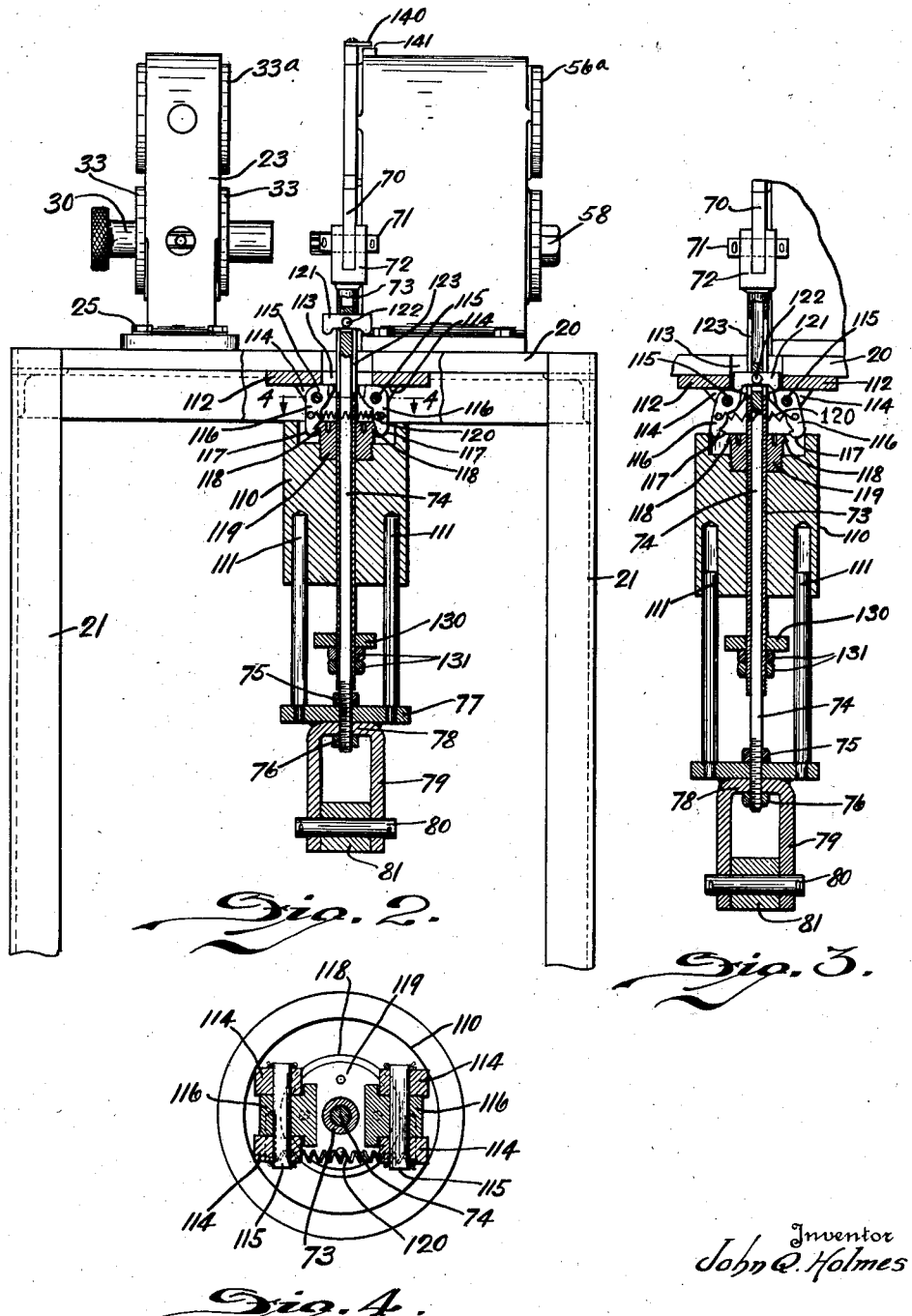

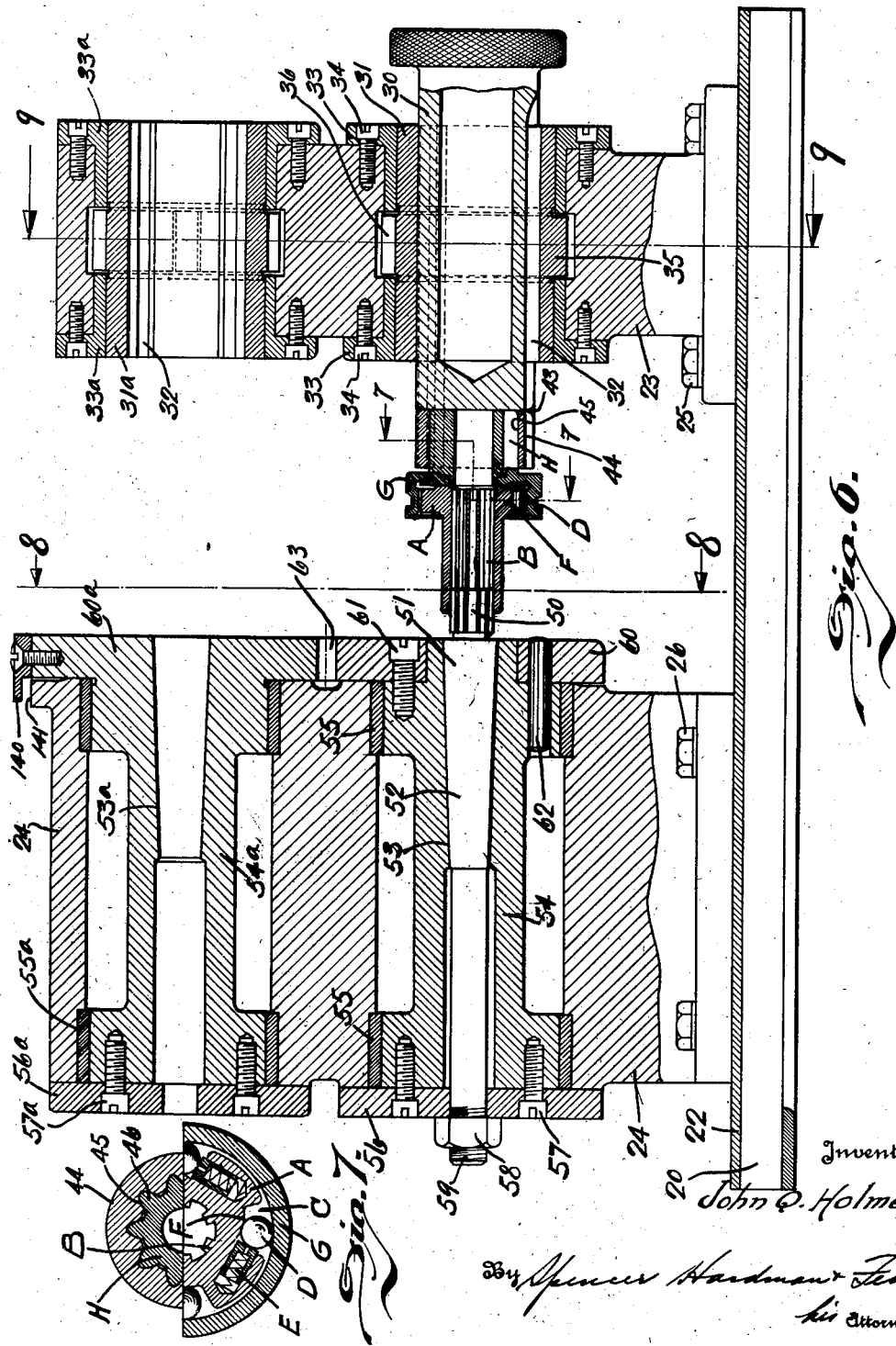

Patented Feb. 19, 1935

1,991,672

UNITED STATES PATENT OFFICE 1,991,672

CLUTCH TESTING APPARATUS

John Q. Holmes, Anderson, Ind., assignor, by mesne assignments, to General Motors Corporation, Detroit, Mich., a corporation of Delaware Application May 16, 1930, Serial No. 452,962

7 Claims. (Cl. 73—51)

This invention relates to one way or automatic overrunning clutches and one of the objects is to provide apparatus for testing the ability of an overrunning clutch to take hold, that is, to transmit torque when a turning force is applied to the clutch driving member in a direction such as is intended to cause it to turn the driven member. In the disclosed embodiment of the present invention this object is accomplished by providing a clutch holder having a non-rotatable part engageable with the driven member of the clutch and having a rotatable part engaging the driving member. To the rotatable part there is attached an operating lever to which a predetermined force is applied by the dropping of a weight a certain distance upon a stop member connected with the lever.

Further objects and advantages of the present invention will be apparent from the following description, reference being had to the accompanying drawings wherein a preferred embodiment of one form of the present invention is clearly shown.

In the drawings:

Fig. 2 is an end elevation partly in section taken on the line 2—2 of Fig. 1.

Fig. 3 is a fragmentary sectional view showing certain elements of the apparatus in a position different from that shown in Fig. 2.

Fig. 4 is a sectional view on line 4—4 of Fig. 2.

Fig. 6 is a sectional view on line 6—6 of Fig. 5 and is drawn to a larger scale than Fig. 5. Fig. 6 is also a sectional view on the line 6—6 of Fig. 9.

Figure 1:
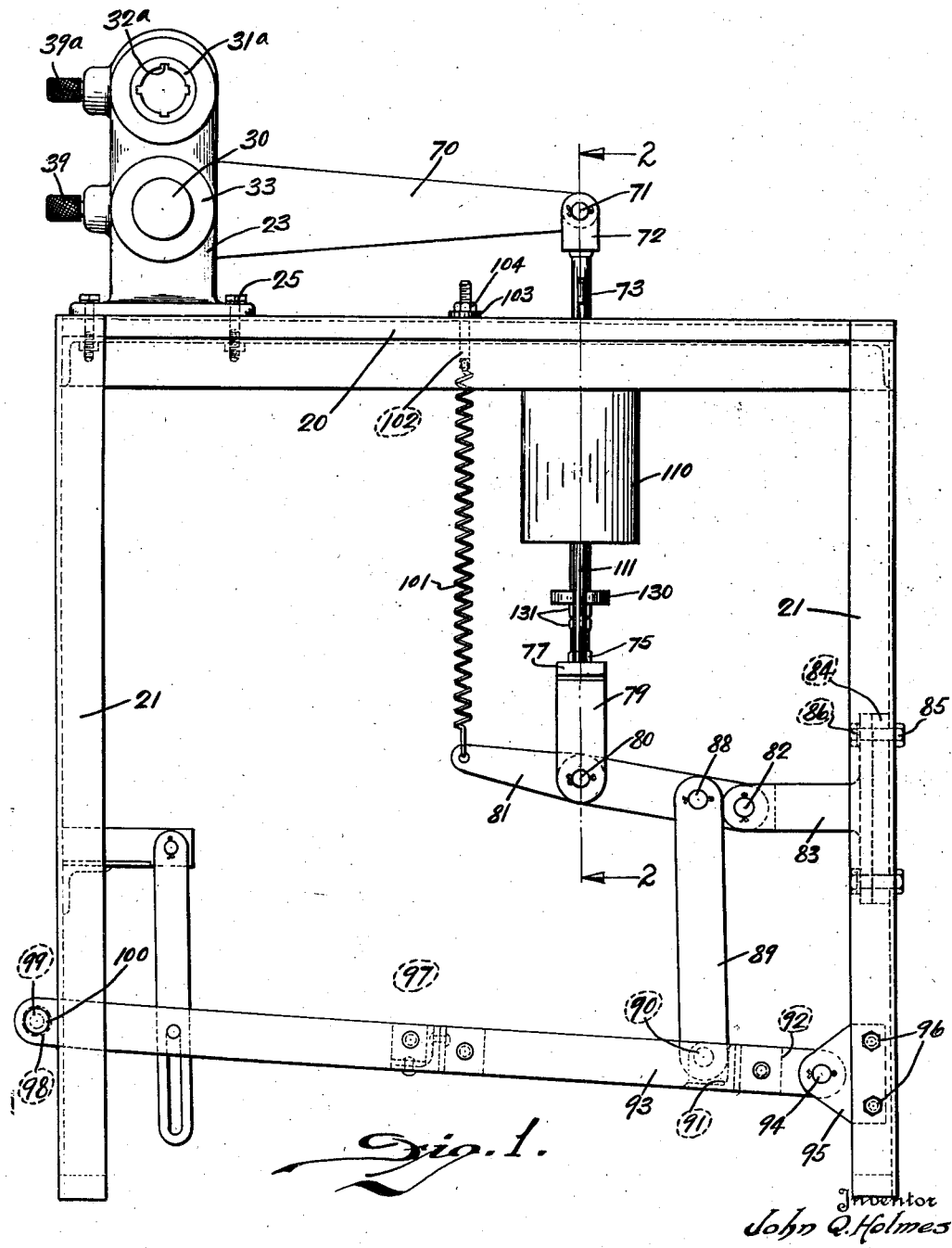
Fig. 1 is a side elevation of apparatus constructed according to the present invention.

Figs. 7, 8 and 9 are sectional views taken respectively on lines 7—7, 8—8 and 9—9 of Fig. 6.

The apparatus comprises a table 20 supported by legs 21. Upon the table 20 there is located a plate 22 to which frames 23 and 24 are secured by screws 25 and 26 and which support respectively fixed and movable parts of the testing apparatus.

The frame 23 supports a sleeve 30 which is longitudinally slidable through a sleeve 31 and is fixed against rotation relative to sleeve 31 by keys 32. The sleeve 31 is rotatable in bearings 33 attached by screws 34 to the frame 23. Between the inner ends of the bearing 33 the sleeve 31 is provided with a collar 35 having notches 36 each adapted to be engaged by a plunger 37 urged by a spring 38 toward the collar 35. A handle 39 attached to each plunger 37 may be manipulated to withdraw the plunger from a notch so that the sleeve 31 may be turned 90 degrees or a multiple thereof and then locked by the plunger in position. A screw 40 having an end portion 41 which enters an elongated groove 42 in the sleeve 30 limits axial movement of the sleeve 30.

The disclosed embodiment of the present invention is particularly adapted for testing overrunning clutches for starter drives for connecting an electric motor with an internal combustion engine to be started. The clutch comprises a clutch cam or driving member A, see Figs. 6 and 7, having an internally splined hub B. The cam A is notched at C to receive rollers D urged by spring pressed plungers E along the camming surface F and into wedging engagement between this surface F and the internal cylindrical surface of a clutch shell G to which a driving pinion H is attached. To the sleeve 30 there is welded at 43 a sleeve 44 provided internally with notches 45 each receiving a tooth 46 of the pinion H.

The splined hub B of the driving member A receives an externally splined portion 50 of a rod 51 having a conical portion 52 which is wedged into a conical hole 53 in a shaft 54 journalled in bearings 55 provided by the frame 24. The shaft 54 is prevented from moving toward the right by a plate 56 secured to the shaft 54 by screws 57. By turning a nut 58 threaded on the end 59 of the rod 51 against the outer surface of the plate 56, the conical portion 52 of the rod 51 will be tightly wedged in the conical hole 53. The rod 54 is prevented from moving toward the left by a disc 60 attached by screws 61 to the rod 54 and drivingly connected therewith also by a dowel pin 62. The disc 60 provides a gear segment 63 which meshes with a segment 64 of a disc 60a similar to disc 60 but integral with shaft 54a journalled in bearing 55a and attached by screws 57a to a disc 56a. The shaft 54a is provided internally with a conical surface 53a which receives also the conical surface 52 of the rod 51. The shaft 54a is axially aligned with a sleeve 31a identical in construction with sleeve 31 below it and journalled in bearings 33a attached to the bracket 23. The sleeve 31a is provided with longitudinal grooves 32a each adapted to receive a key 32 which is attached to the sleeve 30. It is therefore apparent that either shaft 54 or 54a will receive and support the rod 51, and either sleeve 31 or 31a will receive the sleeve 30. Thus the apparatus can be arranged for testing clutches which overrun in either direction. For example, if the clutch cam A will drive the shell G when the former rotates clockwise as viewed in Fig. 7, then the clutch is attached as shown in Fig. 6 to the sleeve 30 and rod 51. If the clutch cam A drives the shell G in a direction opposite to that shown in Fig. 7, then the clutch is supported by the parts 31a and 54a. To accomplish this the rod 51 is removed from the shaft 54 and is mounted upon the shaft 54a and the sleeve 30 is removed from the sleeve 31 and mounted upon the sleeve 31a. However, if parts 51 and 30 are duplicated then an extra set of these parts can be attached to shaft 54a and sleeve 31a.

The disc 60 is integral with an arm 70 connected by a pin 71 with a clevis 72 attached to the upper end of a tube 73 which surrounds a rod 74. The rod 74 is threaded at its lower end to receive nuts 75 and 76 between which are clamped a bar 77 and the yoke 78 of a clevis 79 which is attached by a pin 80 to a lever 81 pivoted at 82 upon a bracket 83 attached by bolts 85 and 86 to a plate 84 secured to table legs 21 in any suitable way. The lever 81 is connected by a pin 88 with a link 89 pivotally connected by a pin 90 with a cross bar 91 attached at its ends by angle clips 92 to a pair of levers 93 which are pivoted upon pins 94 attached to brackets 95 secured by screws 96 to the table legs 21.

The levers 93 are braced by a second angle bar 97 and by a tube 98 spacing the free ends of the levers 93. Through the tube 98 there passes a bolt 99 having a threaded end receiving the nut 100. The rod 98 serves as a pedal by which the apparatus may be operated. A spring 101 attached at its upper end to an adjusting screw 102 passing through the table 20 and through a washer 103 and receiving a nut 104, and attached at its lower end to the lever 81 serves to maintain the latter normally in the position shown in Figs. 1 and 2.

Figure 5:
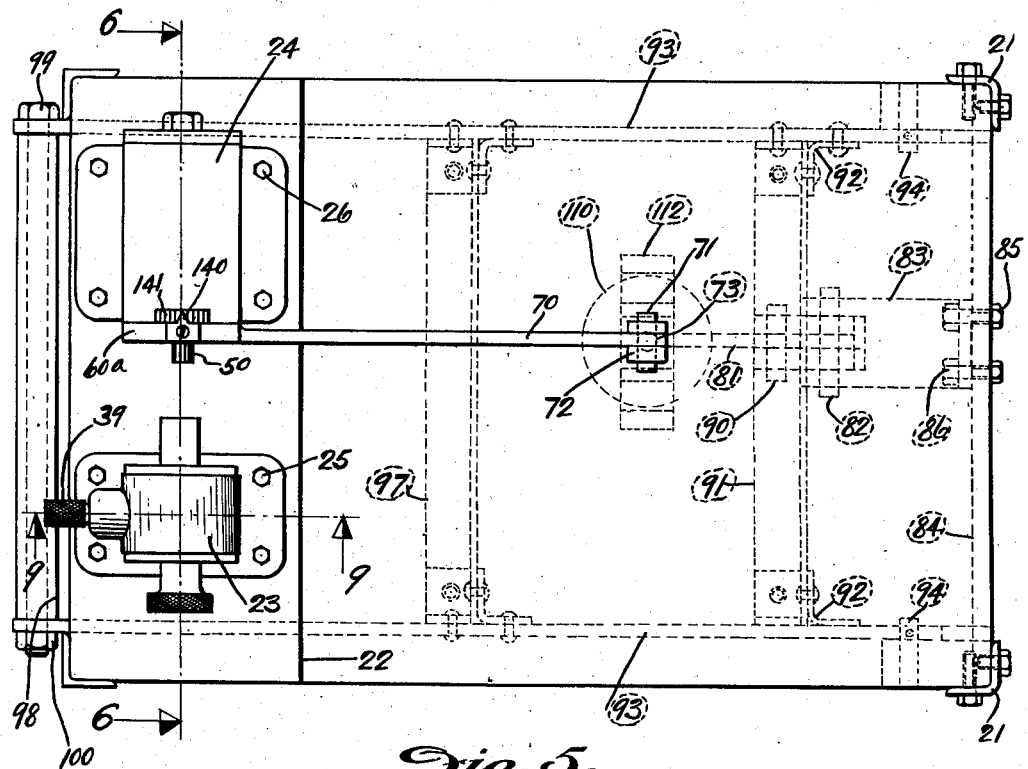
Fig. 5 is a plan view of the apparatus.

When the lever 81 is in normal position a weight 110 supported as shown in Fig. 2 upon the upper ends of rods 111 attached to the bar 77, is located in a position so as to be latched to a bracket 112 attached to the underside of the table 20. The bracket 112 is provided with an aperture 113 through which the tube 73 and rod 74 extend. The bracket 112 provides two pairs of ears 114 each supporting a pin 115 upon which a latch 116 is pivoted. The lower end of each latch provides a hook 117 adapted to engage the under side of a flange 118 of a plug 119 threaded into the weight 110. The hooks 117 of the latches 116 are yieldingly urged toward each other by a spring 120. The latches are moved away from the plug 119 in order to cause the weight 110 to fall by downward movement of the rod 74 which is effected by downward movement of the pedal 98 and consequent downward movement of the lever 81. When the rod 74 has been moved by the pedal into the position shown in Fig. 3 a latch trip bar 121, pinned at 122 to the rod 74 and extending in opposite directions from the pin 122 through slots 123 in the tube 73, will engage the latches 116 and move them from the position shown in Fig. 2 to that shown in Fig. 3. The plug 119 having been released from the latches, the weight 110 will descend upon a stop plate 130 threadedly attached near the lower end of the tube 73 and locked in position by nuts 131. The impact of the falling weight 110 upon the plate 130 will be transmitted by the tube 73 to the lever 70 in order to operate thereon as a force tending to turn the lever 70 in a clockwise direction as viewed in Fig. 1 thereby tending to turn the clutch driving member A in the same direction as viewed in Fig. 7. When the clutch is properly made there will be substantially no slipping between the driving and driven members of the clutch hence there will be substantially no movement of the lever 70. The amount of movement may be read by observing a pointer 140 attached to the disc 60a and pointing to scale divisions marked upon a surface 141 integral with the frame 24 as shown particularly in Fig. 5. If the pointer moves more than a predetermined distance from normal, the clutch may be rejected.

When the pedal 98 is released, the spring 101 returns the lever 81 to normal position thereby restoring the weight 110 to uppermost position in which it is reengaged by the latches 116.

If the overrunning clutch supported by shaft 54 and sleeve 31 drove in a counterclockwise direction as viewed in Fig. 7 it is obvious that the testing apparatus would need to be arranged so that the weight would urge the lever 70 in a counterclockwise direction as viewed in Fig. 1. Obviously, such an arrangement would not be possible without a considerable change in construction or duplication of parts except for the fact that the apparatus provides a second pair of fixed and movable supports 31a and 54a, the latter being geared to the lower support 54. When it is desired to test a clutch which drives in a counterclockwise direction as viewed in Fig. 7, the clutch driven member is fixed to the support 31a by a suitable sleeve 30 and the clutch driving member is fixed to the shaft 54a by a suitable rod 51.

The clutch may be tested four times with the clutch shell in four different positions relative to the clutch driving cam. The plunger 39 is withdrawn from the notch 36 in the sleeve collar 35 and the sleeve 31 is turned 90 degrees into a new position and the plunger 39 is released to lock the shell in its new position. This manipulation is followed by a downward movement of the pedal 98 to release the testing weight. This process is repeated four times, each time locating and fixing the collar 35 in a different position.

While the form of embodiment of the present invention as herein disclosed, constitutes a preferred form, it is to be understood that other forms might be adopted, all coming within the scope of the claims which follow.

What is claimed is as follows:

1. Apparatus for testing one-way over-running clutches comprising, in combination, a stationary member engageable with the clutch driven-member, a rotatable member engageable with the clutch driving-member, a lever attached to the rotatable member, a weight, and means operative to cause the weight to descend by gravity a predetermined distance into operative connection with the lever.

2. Apparatus for testing one-way over-running clutches comprising, in combination, a stationary member engageable with the clutch driven-member, a rotatable member engageable with the clutch driving-member, a lever attached to the rotatable member, a substantially vertical rod connected with the lever, a weight vertically slidable along the rod, and a stop connected with the rod and adapted to be engaged by the weight as said weight slides on said rod.

3. Apparatus for testing one-way over-running clutches comprising, in combination, a stationary member engageable with the clutch driven-member, a rotatable member engageable with the clutch driving-member, a lever attached to the rotatable member, a substantially vertical rod connected with the lever, a weight vertically slidable along the rod, a latch for normally holding the weight in elevated position, a stop connected with the rod and located a predetermined distance below the weight and upon which the weight descends when the latch is retracted, and means for retracting the latch to release the weight.

4. Apparatus according to claim 3 further characterized as having means for returning the weight to normal position in which it is re-engaged by the latch.

5. Apparatus for testing one-way over-running clutches comprising, in combination, a stationary member engageable with the clutch driven-member, a rotatable member engageable with the clutch driving-member, a vertically movable weight and a stop member operatively connected with the rotatable member and adapted to be engaged by the weight on downward movement thereof.

6. Apparatus for testing one-way over-running clutches comprising, in combination, a stationary member engageable with the clutch driven-member, a rotatable member engageable with the clutch driving-member, a weight, a stop member operatively connected with the rotatable member and upon which the weight descends, a latch for holding the weight a predetermined distance above the stop member, and means for releasing the latch.

7. Apparatus according to claim 4 further characterized as having means for returning the weight to uppermost position in which it is retained by the latch.

JOHN Q. HOLMES.